(12) United States Patent
Buechel-Rimmel

(10) Patent No.: US 8,668,953 B1
(45) Date of Patent: Mar. 11, 2014

(54) ANNEALING PROCESS FOR ELECTROLESS COATED DISKS FOR HIGH TEMPERATURE APPLICATIONS

(75) Inventor: Dorothea Buechel-Rimmel, San Jose, CA (US)

(73) Assignee: WD Media, LLC, San Jose, CA (US)

(*) Notice: Subject to any disclaimer, the term of this patent is extended or adjusted under 35 U.S.C. 154(b) by 37 days.

(21) Appl. No.: 12/979,623

(22) Filed: Dec. 28, 2010

(51) Int. Cl.
*B05D 3/12* (2006.01)
*B05D 5/12* (2006.01)
*G11B 5/706* (2006.01)

(52) U.S. Cl.
USPC ............ 427/130; 427/419.1; 428/846.4

(58) Field of Classification Search
CPC .. G11B 5/7315; G11B 5/82; G11B 11/10582; B05C 11/08; B82Y 10/00
USPC .......... 428/610, 827, 836.1, 833, 826, 846.6, 428/800, 695, 842.2; 501/37, 36; 427/599, 427/128, 130, 131, 132, 264, 271, 539, 331, 427/419.1, 438; 51/308; 29/874, 876, 882; 438/660, 661, 662
See application file for complete search history.

(56) References Cited

U.S. PATENT DOCUMENTS

| | | | |
|---|---|---|---|
| 5,500,290 A * | 3/1996 | Udagawa et al. | 428/610 |
| 5,645,898 A * | 7/1997 | Sato et al. | 427/539 |
| 6,117,499 A * | 9/2000 | Wong et al. | 427/599 |
| 6,973,722 B2 * | 12/2005 | Hantschel et al. | 29/874 |
| 2001/0055700 A1 * | 12/2001 | Dykes et al. | 428/848.6 |
| 2003/0096140 A1 * | 5/2003 | Tomiyasu et al. | 428/695 |
| 2003/0207154 A1 * | 11/2003 | Shimoda | 428/848 |
| 2003/0228495 A1 * | 12/2003 | Kuboki et al. | 428/846.4 |
| 2006/0019122 A1 * | 1/2006 | Kawano et al. | 428/836.1 |
| 2008/0037407 A1 * | 2/2008 | Takahashi et al. | 428/826 |
| 2008/0050616 A1 * | 2/2008 | Lee et al. | 427/128 |
| 2008/0076327 A1 * | 3/2008 | Yamaguchi et al. | 451/36 |
| 2008/0131737 A1 * | 6/2008 | Sakaguchi et al. | 428/846.6 |
| 2010/0209735 A1 * | 8/2010 | Yoshimura et al. | 428/800 |

* cited by examiner

*Primary Examiner* — Kevin M. Bernatz
*Assistant Examiner* — Louis Falasco

(57) ABSTRACT

A method of manufacturing a disk for a magnetic storage device is provided. The method comprises electroless plating a coating layer over a substrate to produce the disk, the coating layer forming an exterior surface of coating over the substrate, and annealing the coating layer using a heating source, wherein heat radiating from the heating source is directionally focused onto the exterior surface before the exterior surface is polished.

17 Claims, 3 Drawing Sheets

ANNEALING PROCESS FOR ELECTROLESS COATED DISKS FOR HIGH TEMPERATURE APPLICATIONS

TECHNICAL FIELD

This invention relates to hard disk drives and, more specifically, to the field of manufacturing electroless coated disks.

BACKGROUND

At present, disks used in hard drive media frequently include an aluminum-magnesium (AlMg) substrate that is plated with materials, such as nickel-phosphorous (NiP), which provide a smooth surface on which to deposit magnetic recording layers used to store data. In order to increase data storage space, hard disk drives may utilize technologies such as EAMR (Energy Assisted Magnetic Recording), which require magnetic recording layers with high magnetic anisotropy (Ku). Often, such high magnetic anisotropy magnetic recording layers include alloys that require deposition temperatures in excess of 300° C. (e.g., Fe, Pt, Sm and Co). However, the NiP coating currently used to provide the magnetic recording layer in disk media (e.g., EAMR media) with its smooth surface cannot withstand temperatures in excess of 300° C., at least not without dramatically increasing the magnetic recording layer's surface roughness.

Fortunately, hard drive disks have been developed where the substrate comprises an alloy of aluminum (Al), and a coating layer designed to support high thermal stability during high sputtering temperatures (e.g., greater than 300° C.). The coating layer for the developed disk comprises Ni, $X_1$ and $X_2$, wherein $X_1$, comprises one or more elements selected from the group consisting of Ag, Au, B, Cr, Cu, Ga, In, Mn, Mo, Nb, Pb, Sb, Se, Sn, Te, W, Zn, and Zr, and wherein $X_2$ comprises either B or P. Typically, the coating layer is applied to the disk through an electroless plating process, which is eventually followed by a polishing process to increase the smoothness of the resulting disk surface before deposition of the magnetic recording layer. It has been shown that polished AlMg/Ni—X1—X2 disks exhibit higher thermal stability when compared to conventional NiP-coated AlMg disks.

FIG. 1 is a diagram illustrating an example disk 100 comprising an aluminum (Al) alloy substrate 101, and a Ni—$X_1$—$X_2$ coating layer 103. The coating layer 103 is disposed over the substrate 101 and comprises an alloy of Ni, X1 and X2. Depending on the implementation, the coating layer 103 may be between about 1 and 20 μm in thickness. Disk 100 further comprises a zincate layer 102 disposed between substrate 101 and coating layer 103, which helps prevent the aluminum substrate 101 from oxidizing. At the top of disk 100 is the magnetic recording layer 104, which, as discussed above, may comprise a material, such as Fe, Pt, Sm and Co, requiring a high temperature (e.g., over 300° C.) deposition process to be applied to the disk.

BRIEF DESCRIPTION OF THE DRAWINGS

The present invention is illustrated by way of example, and not limitation, in the figures of the accompanying drawings in which.

DETAILED DESCRIPTION

Figure 1:
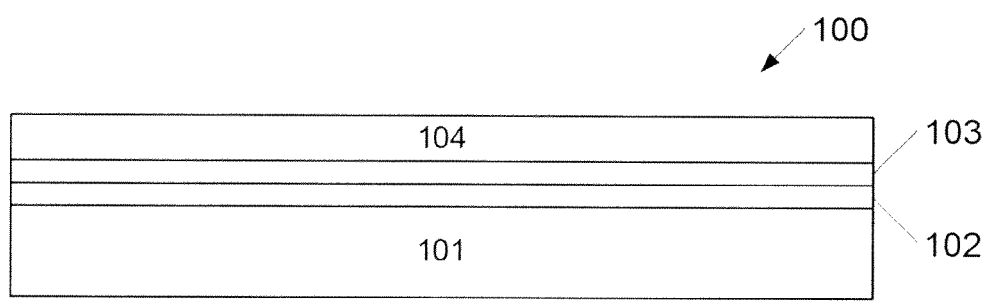
FIG. 1 (prior art) illustrates a disk for use in a hard disk drive comprising a Ni—$X_1$—$X_2$ coating layer.

In the following description, numerous specific details are set forth to provide a thorough understanding of various embodiments of the present invention. It will be apparent however, to one skilled in the art that these specific details need not be employed to practice various embodiments of the present invention. In some instances, well known components or methods have not been described in detail to avoid unnecessarily obscuring various embodiments of the present invention.

Embodiments of the present invention provide for systems and methods for manufacturing a disk for a hard disk drive and, more specifically, performing an annealing process on a disk coating layer prior to the coating layer being polished. Depending on the embodiment, such a pre-polish annealing may be performed subsequent to the deposition of a coating layer onto the disk (e.g., by way of electroless coating). For example, the pre-polish annealing may be performed on a AlMg/Ni$X_1X_2$ disk before the Ni—$X_1$—$X_2$ coating layer is polished, but subsequent to the Ni—$X_1$—$X_2$ coating layer being electrolessly plated onto the AlMg substrate. Additionally, in some embodiments, the annealing process is performed in a vacuum or inert gas atmosphere. By doing so, such embodiments reduce the possibility of the coating layer oxidizing.

By performing a pre-polishing annealing process on an electroless plated (i.e., coated) disks, any amorphous coating layers are homogenized, and any gas inclusions formed within an coating layer during the plating process are driven out. Additionally, by performing the annealing process before the polishing operation, the formation of roughness, defects, and inhomogenties during deposition of the magnetic media are avoided.

In some embodiments, the temperature utilized for a pre-polish annealing process is about 250° C. or lower. For example, the pre-polish annealing may be performed by way of a convection-type tunnel over, in which disks are moved through a stream of hot gas (e.g., air) measuring about 250° C., thereby annealing the coating layer of those disks.

For those disk media that require higher temperature (i.e., 250° C. and above) during manufacturing (e.g., during deposition of the magnetic recording layer), some embodiments perform a high temperature pre-polish annealing process to the coating layer by applying, for a short period of time, focused heat (e.g., from a radiant, directional heat source) onto the surface of the coating layer surface. In some such embodiments, the high temperature used during the pre-polish annealing is as close as possible to the temperature used during the magnetic recording layer deposition process that eventually follows. For example, if the magnetic recording layer deposition process will be using temperatures >350° C., the pre-polish annealing operation will be performed using a temperature >350° C. Depending on the embodiment, the temperature used for the pre-polishing annealing process may be within 15° C. of the highest temperature subsequently used during the disk's manufacture (e.g., highest temperature used in the magnetic recording layer deposition process that eventually follows the pre-polish annealing).

The heating sources used to generate the focused heat may include, for example, resistant heaters, quartz lamps or a focused stream of hot gas. Additionally, the process may be performed in an inert gas atmosphere or a vacuum. By performing the high temperature pre-polish annealing process in accordance with some embodiments described, the surface of the coating layer is heated, annealed, and homogenized, while avoiding the transfer of excessive heat towards the core of the disk media.

Such embodiments would be useful for EAMR media and other media that utilize magnetic recording layers having high magnetic anisotropy (Ku) and contain materials that require deposition processes that exceed 350° C. As a result, the coating layer for such EAMR media must be annealed at a temperature at or above 350° C. before the coating can be polishing. However, without the high temperature pre-polish annealing step described above, the AlMg core and the Ni—$X_1$—X2 coating layer for a EAMR media comprising AlMg/Ni$X_1X_2$ would be heated to a equilibrium temperature exceeding 350° C., eventually resulting in the formation of increased low-frequency roughness (LFRa) in the coating layer. This is primarily due to the mismatch in the coefficient of thermal expansion (CTE) between the AlMg core and the Ni—$X_1$—X2 coating layer—(the CTE of AlMg is about $23 \times 10-6/°$ C. to $25 \times 10-6/°$ C.; the CTE of Ni—P is approximately between $12 \times 10-6/°$ C. and $14.5 \times 10-6/°$ C.). Further, with temperatures exceeding 250° C., the NiX1X2 coating layer of a AlMg/Ni$X_1X_2$ disk would discolor and oxidize (this has been observed for NiX1X2 that have been heated by air measuring >250° C.).

In further embodiments, the pre-polish annealing process can be performed for one side of the disk at a time, while the opposite side, which is pointing away from the utilized heat source, may be cooled to avoid the disk core (e.g., AlMg) from expanding. In such embodiments, the cooled side is can then be annealed later, while the previously heated side is cooled. Depending on the embodiment, the cooling and heating processes may be carefully adjusted in order to avoid excessive internal stress in the disk.

Figure 2:
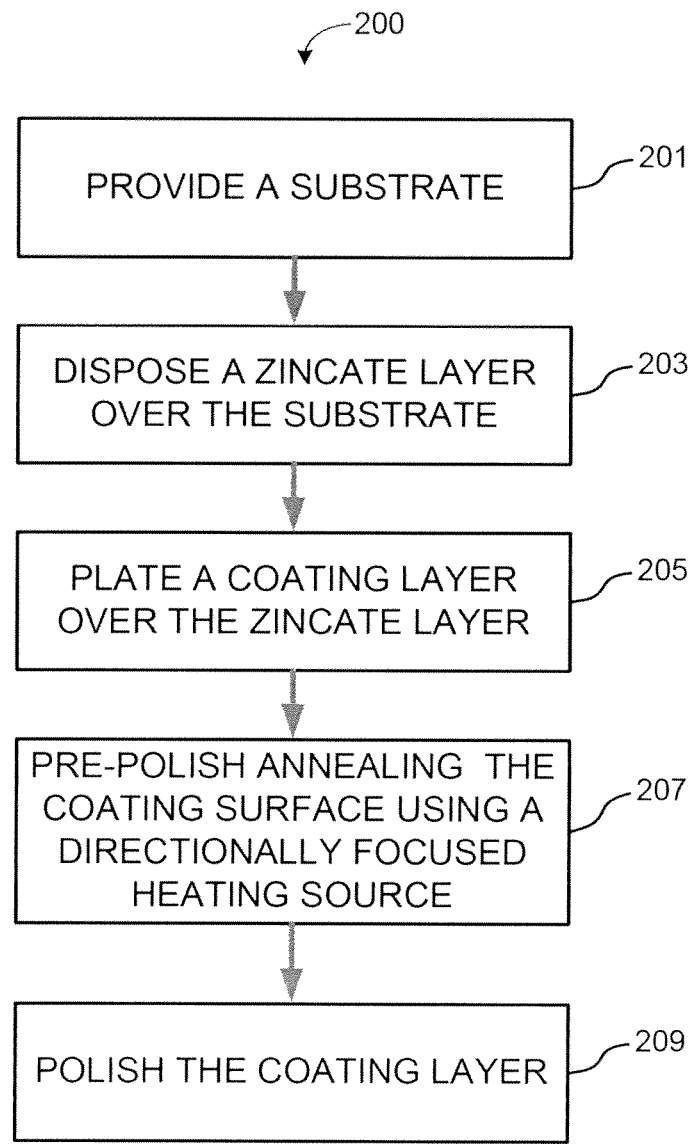
FIG. 2 is a flow chart illustrating an example method of forming a disk for a hard disk drive in accordance with one embodiment of the present invention.

FIG. 2 provides a flow chart illustrating a method 200 of forming a disk for a hard disk drive comprising an aluminum (Al) alloy substrate, and a coating layer comprising an alloy of Ni, $X_1$ and $X_2$. As described above, $X_1$ may comprise one or more elements selected from the group consisting of Ag, Au, B, Cr, Cu, Ga, In, Mn, Mo, Nb, Pb, Sb, Se, Sn, Te, W, Zn, and Zr, and $X_2$ may comprise either B or P.

Method 200 begins with operation 201, where a substrate comprising aluminum is provided (e.g., AlMg). Next, at operation 203, a zincate layer is disposed over the substrate, which may be by way of an alkaline bath under high pH conditions or by way of an acid zinc immersion process. This is followed by operation 205, which disposed a Ni—$X_1$—$X_2$ coating layer over the zincate layer by way of electroless plating. This results in the formation of an exterior surface of Ni—$X_1$—$X_2$ coating over the zincate layer (and, therefore, the Al allow substrate 101).

Operation 205 may facilitate this by disposing the substrate in a plating bath that includes one or more metal sources for each of Ni and $X_1$, a reducing agent for reducing the one or more metal sources, the reducing agent comprising $X_2$, one or more complexors to reduce metal precipitation, one or more stabilizers, and one or more pH adjusting additives. Depending on the embodiment, the plating bath may further comprise dispersants, anionic surfactants, nonionic surfactants, and organosulfur compounds.

The plating bath may have a pH of between about 5 and about 9, thereby allowing the implementation of each constituent of $X_1$ from about 1.5 weight percent up to about 42 weight percent. In some embodiments, the plating bath is maintained at a temperature between about 160° F. and about 195° F. while the substrate is disposed in the plating bath. Additionally, for some embodiments described, the plating bath has a metal turn over (MTO) of less than 6. For example, the MTO of the plating bath may be maintained between about 2.0 and 4.5. Maintaining the MTO within these levels allows for an economic plating performance and consistently reproducible plating results. Over the lifetime of the plating bath, dialysis of the orthophosphite in the bath may be utilized to keep the orthophosphite concentration stable.

With respect to the coating layer materials, possible sources for Ni may comprise nickel sulfate, nickel sulfamate, nickel acetate, nickel chloride, nickel hypophosphite, or nickel fluor-borate, while possible sources for $X_1$ may comprise copper sulfate, copper iodate, copper iodide, copper chloride, indium citrate, indium sulfate, indium acetate, molybdic acid, ammonium molybdate, sodium molybdate, ammonium tungstate, sodium tungstate, or indium chloride.

Depending on the embodiment, the one or more reducing agents may comprise salts of hypophosphite, nickel hypophosphite, dimethylamine borane (DMAB), diethylamine borane (DEAB), amine borane, or sodium borohydride. Additionally, in some embodiments, the one or more complexors comprise citric acid, malic acid, lactic acid, amino acids, tartaric acid, ethylenediaminetetraacetic acid (EDTA), a carboxylic acid, or any salt thereof.

In further embodiments, the one or more stabilizers comprise one or more cations of Bi, Cd, Cu, Hg, In, Mo, Pb, Sb and Sn, $AsO^{-2}$, $MoO^{-4}$, $IO_3^-$, $NO_3^-$, maleic acid, itaconic acid, methylbutynol, N,N-Diethyl-2-propyne-1-amine and 2-Butyne-1,4-diol. The one or more stabilizers, used to prevent the decomposition of the bath (e.g., by preventing nucleation of nickel particles in the bath), may comprise iodine or a compound thereof.

In some embodiments, the one or more pH adjusting additives comprise one or more of $K_2CO_3$, $Na_2CO_3$, $KHCO_3$, $NaHCO_3$, NaOH, KOH, $NH_4OH$ and $N(CH_2CH_3)_3$. In further embodiments, the one or more pH adjusting additives comprise a buffer selected from the group consisting of boric acid, borax, triethanolamine, triethylene pentamine, diethylenetriamine, acetate salts, propionate salts, succinate salts, and adipate salts.

Continuing with method 200, at operation 207, the pre-polish annealing process is performed on the coating layer. In some embodiments, the pre-polishing annealing is performed by a directionally radiant heat source, such as a resistant heaters, a quartz lamp or a focused stream of hot gas. Additionally, the pre-polish annealing may performed in an inert gas atmosphere or a vacuum. The temperature used during the pre-polish annealing is as close to the temperature used during the magnetic recording layer deposition process that eventually follows. Hence, if the magnetic recording layer deposition process that eventually follows the pre-polishing annealing process will be using temperatures >350° C., the pre-polish annealing operation will be performed using a temperature >350° C. As noted before, depending on the embodiment, the temperature used for the pre-polishing annealing process may be within 15° C. of the highest temperature subsequently used during the disk's manufacture.

Further, depending on the embodiment, the pre-polish annealing operation may last for a short period of time. For example, in some embodiments, the pre-polish annealing operation may lasts between 7 to 11 seconds. The eventual result of the high temperature pre-polish annealing process is a coating layer that has been heated, annealed, and homogenized, all while avoiding the transfer of excessive heat towards the core of the disk media.

At operation 209, the coating layer is polished with a slurry comprising an abrasive in an aqueous solution. Example abrasives may include one or more of nanodiamond, alumina, titania, zirconia, germania, silica, ceria and any mixture thereof. Depending on the embodiment, the pH of the slurry may be maintained between 3 and 9 during the polishing. Additionally, the slurry may further comprise an oxidizing agent, a complexing agent, and one or more organic amino compounds. The oxidizing agent for the slurry may include, for example, one or more peroxy compounds (e.g., hydrogen peroxide), urea, permanganates, nitrates, and iodates. The complexing agent for the slurry may include, for example, one or more of citric acid, lactic acid, tartaric acid, succinic acid, malonic acid, oxalic acids, amino acids or salts thereof. The organic amino compounds for the slurry may include, for example, triethanolamine or the like.

Figure 3A:
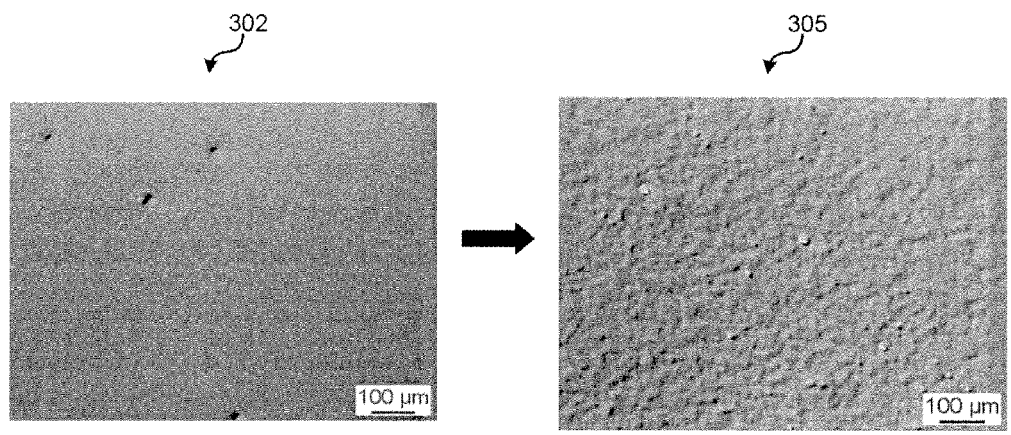
FIG. 3A shows optical microscope images of the surface of an example coating layer annealed conventionally.
Figure 3B:
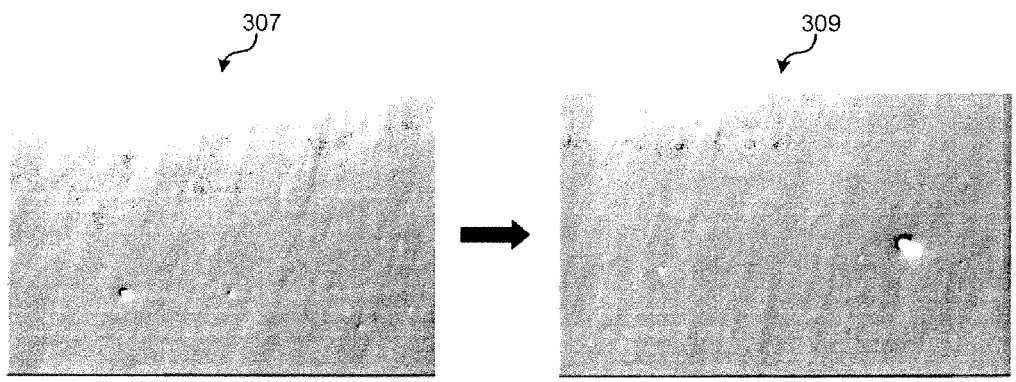
FIG. 3B shows optical microscope images of the surface of an example coating layer annealed in accordance with one embodiment of the present invention.

Improvements to a pre-polish annealed coating layer process has been shown in experimental embodiments. FIGS. 3A and 3B illustrate one such improvement. FIG. 3A shows optical microscope images of the surface of an example coating layer annealed conventionally, while FIG. 3B shows optical microscope images of the surface of an example coating layer annealed in accordance with an experimental embodiment of the invention.

Turning now to FIGS. 3A and 3B, images 302 and 307 show "as-plated" AlMg/NiX1X2 disks with pre-polish annealed coating layers. The images of the disks 302 and 307 were taken after the disks were pre-polish annealed, and polished using a slurry based polishing process. The disk in 302 was pre-polish annealed using a conventional procedure (about 250° C. for ~30 min in a convection oven). The disk in 307 was pre-polish annealed in accordance with an embodiment of the present invention, where the disk was pre-polish annealed for a short period of time using a temperature similar to the temperature that will be used during the deposition step (>350° C. for ~7 to 11 secs by directionally radiant heat source). Both disks were pre-polish annealed in a vacuum (at 10-7 to 10-8 Torr). The directionally radiant heat source for the disk in 307 was provided by a sputtering tool machine heater station equipped with two resistance heater coils, each coil heating one side of the disk by radiation.

Based on post-polishing full surface flatness (peak to valley) and AFM roughness measurements, both disks shown (in 302 and 307) exhibited a flatness below 6.5 μm and AFM Ra (10 μm×10 μm) of <0.3 nm and low FLRa (indicated by the lack of contrast in the images).

The disks shows in 302 and 307 were then sent through a heater module in a sputtering machine to mimic the heat exposure from an EAMR media deposition (i.e., EAMR magnetic recording layer deposition). The disks within 302 and 307 were heated to temperature >350° C. No coatings were applied to the disks. After the disks were removed from the sputtering machine, images 305 and 309 of the disks were taken, and the disks were re-inspected for changes in roughness and/or flatness. The AFM roughness of the disk in 305 (i.e., AlMg/NiX1X2 disk pre-polish annealed by conventional means) increased, while the AFM roughness of the disk in 309 (i.e., AlMg/NiX1X2 disk pre-polish annealed using an embodiment) stayed relatively the same. Full surface flatness remained <6 μm for both disks.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

What is claimed is:

1. A method of manufacturing a disk for a magnetic storage device, the method comprising:
   electroless plating a coating layer over a substrate to produce the disk, the coating layer forming an exterior surface of coating over the substrate, wherein the coating layer comprises an alloy of Ni, X1, and X2, wherein X1 comprises an element selected from the group consisting of Ag, Au, B, Cr, Cu, Ga, In, Mn, Mo, Nb, Pb, Sb, Se, Sn, Te, W, Zn, and Zr, and wherein X2 comprises B or P;
   annealing the coating layer using a heating source, wherein heat radiating from the heating source is directionally focused onto the exterior surface heating the coating layer to a first temperature thereby forming an annealed coating layer such that a roughness of the disk is not changed during a subsequent deposition of a magnetic recording layer over the annealed coating layer; and
   polishing the exterior surface;
   wherein the first temperature that the coating layer is heated to is higher than a second temperature that causes the surface roughness of the disk to change if both the substrate and coating layer are heated to the second temperature.

2. The method of claim 1, wherein the heating source is configured to avoid homogenously heating the disk.

3. The method of claim 1, wherein the heat radiating from the heating source is directionally focused onto the exterior surface of coating such that the heat warms the exterior surface to a first temperature sufficient for annealing the exterior surface without warming the substrate to a second temperature that causes expansion of the substrate.

4. The method of claim 1, wherein the heat radiating from the heating source warms the exterior surface to a first temperature that is within 15° C. from a second temperature used during a second annealing operation performed after the polishing operation.

5. The method of claim 1, wherein the substrate comprises two sides, and wherein electro less plating the coating layer over the substrate results in the exterior surface of coating covering both sides of the substrate.

6. The method of claim 5, wherein annealing the coating layer using the heating source involves focusing heat from the heating source onto the exterior surface of coating on both sides of the substrate.

7. The method of claim 5, wherein annealing the coating layer using the heating source involves focusing heat from the heating source onto the exterior surface of coating on one side of the substrate while cooling the other side of the substrate.

8. The method of claim 1, wherein the exterior surface of coating is exposed to the heat for less than 11 seconds.

9. The method of claim 1, wherein the method further comprises disposing a zincate layer over the substrate before electroless plating the coating layer over the substrate, thereby placing the zincate layer between the coating layer and the substrate.

10. The method of claim 1, wherein the substrate comprises Al.

11. The method of claim 1, wherein the method further comprises disposing the magnetic recording layer over the exterior surface of coating after polishing.

12. The method of claim 1, wherein polishing the coating layer comprises using a slurry comprising an abrasive in an aqueous solution, the abrasive comprising nanodiamond, alumina, titania, zirconia, germania, silica, or ceria.

13. The method of claim 12, wherein the slurry further comprises an oxidizing agent, a complexing agent, and an organic amino compound, wherein the oxidizing agent comprises a peroxy compound, urea, permanganates, nitrates, and iodates, wherein the complexing agent comprises a citric acid, a lactic acid, a tartaric acid, a succinic acid, a malonic acid, an oxalic acids, an amino acids, or a salt thereof, and wherein the organic amino compound comprises triethanolamine.

14. The method of claim 12, wherein the slurry further comprises a corrosion inhibitor comprising benzotriazole or benzoylphenylhydroxylamine.

15. The method of claim 12, wherein the slurry further comprises a stabilizer comprising an ammonium lauryl sulfate, a sodium dodecyl sulfate, or a sodium lauryl sulfate.

16. The method of claim 12, wherein a pH of the slurry is maintained between 3 and 9 during polishing.

17. The method of claim 1, wherein the annealing is performed in a vacuum or inert gas atmosphere.

* * * * *